J. G. RIEFF.
SLEIGH.
APPLICATION FILED FEB. 25, 1918.
1,280,845.
Patented Oct. 8, 1918.
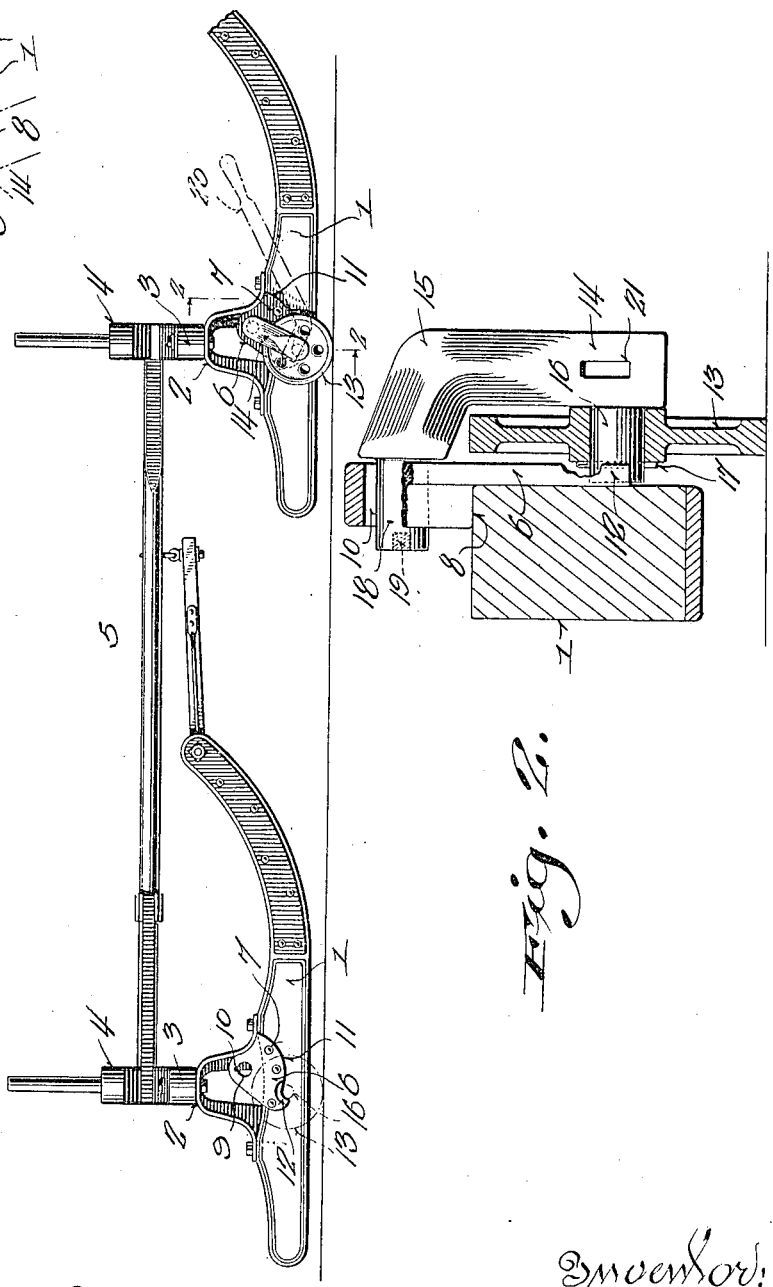

UNITED STATES PATENT OFFICE.

JOHN G. RIEFF, OF LONDON, WISCONSIN.

SLEIGH.

1,280,845. Specification of Letters Patent. Patented Oct. 8, 1918.

Application filed February 25, 1918. Serial No. 219,010.

*To all whom it may concern:*

Be it known that I, JOHN G. RIEFF, a citizen of the United States, and resident of London, in the county of Dane and State of Wisconsin, have invented certain new and useful Improvements in Sleighs; and I do hereby declare that the following is a full, clear, and exact description thereof.

My invention relates to new and useful improvements in sleighs, more particularly to attachments for the runners thereof.

It is at times advisable to elevate the runners of a sleigh to prevent the same from engaging the ground. For instance it may be necessary to move the sleigh over a particularly rough piece of ground on which there is little or no snow or ice. Therefore in order to protect the runners under such circumstances I have provided each of the same with a wheeled support which can be readily swung into or out of operative position at will.

It is also an object of the invention to provide a wheeled support which can be readily attached to or removed from a sleigh runner.

With these and other objects in view the invention resides in the novel features of construction, combination and arrangement of parts which will be hereinafter more particularly described and claimed and shown in the drawing, wherein:

Figure 1 represents a side elevational view of a bob-sleigh running gear equipped with my improved wheeled support.

Fig. 2 is a detail enlarged sectional view on the line 2—2 of Fig. 1, and

Fig. 3 is an inner elevational view of a portion of the attaching means of the wheeled support.

Referring more particularly to the drawing it will be seen that the invention is disposed upon the runners of a bob-sleigh of usual design. It is obvious that in view of the simple nature of the invention it may be readily attached to sleigh runners already in use or those just being incorporated into sleighs. The sleigh running gear illustrated includes two pairs of runners 1 which are secured by the knees 2 to the opposite ends of beams 3; the beams in turn are pivoted to front and rear bolsters 4 that are connected by a reach bar 5.

Each of the runners 1 is equipped with the invention so that they may all be raised out of engagement with the ground as shown in Fig. 1. A journal plate 6 is bolted or riveted as at 7 to each runner 1 at a point preferably midway the ground engaging portion thereof and between the arms of the knee 2. Each of the plates 6 has its inner side shouldered as at 8 for engagement with the outer upper corner of the runner 1 as shown in Fig. 2, and the portion of the plate above this shoulder is formed with a transverse circular hole 9, in the wall of which is formed a kerf 10. The major portion of the lower edge of each plate is curved and concentric with the hole as will appear at 11. The rear end of each of the curved edges 11 merges into a stop 12, the purpose of which will be hereinafter particularly set forth.

The wheeled supports which coöperate with the journal plates 6 each consist of a wheel 13 carried by one arm 14 of a crank 15, said arm 14 having an inwardly extending stub shaft 16 for rotatably carrying the wheel. Said wheel is held on the stub shaft by a cotter pin or the like 17 which is spaced inwardly from the free end of the latter so that said end projects beyond the hub of the wheel as shown in Fig. 2.

The other arm of the crank 15 is cylindrically reduced to form a pivot stud 18 for disposition in one of the holes 9. The pivot studs 18 are of greater length than the thickness of the journal plates 6, and each carries a lug 19 adjacent its free end. From Fig. 3 it will be evident that each pivot stud is associated with its journal plate by alining the lug 19 thereof with the kerf 10 and after said stud has been slid through the hole 9, partial rotation thereof will disaline said lug and kerf and thus prevent longitudinal shifting of said stud. Owing to the disposition of the lugs 19, they are alined with the kerfs 10 when the arms 14 of the cranks 15 are positioned substantially horizontally.

The axis of rotation of each of the arms 14 is disposed forwardly of a vertical plane passing through the point of attachment between the knees 2 and the beams 3, and the stops 12 are positioned rearwardly of such planes. In view of this construction the axes of the wheels 13 will be swung from forward of this vertical plane to a position rearwardly thereof when said wheels are thrown into operative position. In other words the wheels will be moved rearwardly of the dead centers of said cranks 15 and disposed substantially beneath the beams 3 to thus support the entire weight of the sleigh running gear and the body carried thereby. Although the wheels 13 may be of any desired diameter, they are preferably only of sufficient size to raise the ground-engaging portions of the runners 1 slightly above the ground when they are in operative position, that is to say after their axes have been swung past the dead centers of the cranks until the ends of the stub shafts 16 engage the stops 12.

This required movement of the wheels is facilitated by a lever 20, one end of which is insertible in slots 21 formed in the arms 14 of the cranks 15. The same tool is used to move the cranks to inoperative position to lower the runners into engagement with the ground. In view of the ease with which the cranks 15 are associated with the journal plates 6, the former are ordinarily not carried on the runners, but are only attached when needed.

I claim as my invention:

1. The combination with a sleigh runner, of a journal member carried thereby, an arm having at one end a pintle engaged in the journal member and detachable therefrom in raised position of the arm with respect to the runner, said pintle being held in the journal in lowered position of the arm with respect to the runner, and a wheel on the other end of the arm adapted to extend below the runner in lowered position of the arm.

2. The combination with a sleigh runner, of a journal member carried thereby, an angular arm having a pintle at one end engaged in the journal, a stub shaft extending inwardly from the other end of the arm, a wheel provided on said stub shaft and adapted to extend below the runner when the arm is swung downwardly, said stub shaft being extended inwardly of the wheel, and a stop on the runner engageable by said projected end of the shaft to limit swinging movement of the arm in one direction.

3. A wheel attachment for sleigh runners comprising a plate adapted for securement to the outer side of the runner and provided with a journal opening, an arm, a pintle on one end of said arm detachably engageable in the journal opening, means for holding the pintle against disengagement in certain relative positions of the plate and arm, a stub shaft projecting inwardly from the other end of the arm, a ground wheel mounted on said stub shaft, and a stop member on the plate engageable by the stub shaft to limit relative movement of the arm in one direction.

4. A wheel attachment for sleigh runners comprising a plate adapted for securement to the outer side of the runner and provided with a journal opening, an arm, a pintle on one end of said arm detachably engageable in the journal opening, said plate being provided with a kerf extending through the wall of the journal opening, a lug on the pintle movable through said kerf to hold the pintle in the journal opening upon movement from alinement with the kerf, a stub shaft projecting inwardly from the other end of the arm, a ground wheel mounted on said stub shaft, and a stop member on the plate engageable by the stub shaft to limit relative movement of the arm in one direction.

5. A wheel attachment for sleigh runners comprising a plate adapted for securement to the outer side of the runner and provided with a journal opening, an arm, a pintle on one end of said arm detachably engageable in the journal opening, a stub shaft projecting inwardly from the other end of the arm, a ground wheel mounted on said stub shaft, and a stop member on the plate engageable by the stub shaft to limit relative movement of the arm in one direction, the lower edge of said plate being engageable with the stub shaft adjacent said stop to take up load strain on the stub shaft.

In testimony that I claim the foregoing I have hereunto set my hand at London, in the county of Dane and State of Wisconsin.

JOHN G. RIEFF.